March 30, 1943.   W. R. KINNAIRD   2,315,208
CATALYTIC APPARATUS
Filed Oct. 15, 1941   2 Sheets-Sheet 1

INVENTOR
WILLIAM R. KINNAIRD
BY
ATTORNEY

March 30, 1943.  W. R. KINNAIRD  2,315,208
CATALYTIC APPARATUS
Filed Oct. 15, 1941  2 Sheets-Sheet 2

INVENTOR
WILLIAM R. KINNAIRD
BY *Lee J. Farr*
ATTORNEY

Patented Mar. 30, 1943

2,315,208

UNITED STATES PATENT OFFICE 2,315,208

CATALYTIC APPARATUS

William R. Kinnaird, Chicago, Ill., assignor to Universal Oil Products Company, Chicago, Ill., a corporation of Delaware Application October 15, 1941, Serial No. 415,049

4 Claims. (Cl. 23—288)

This invention relates to apparatus in which catalytic reactions or contact may be conducted, and particularly to a reactor wherein the incoming materials are so divided and distributed throughout the zone occupied by the catalyst or contact material that there is a substantially uniform reaction in every part of the contact bed.

In many catalytic processes such as in the catalytic cracking of hydrocarbon oil vapors, it is highly important that the entire catalyst bed be utilized to a like degree in order that the maximum operating efficiency may be realized for the process. By uniformly distributing the incoming reactants throughout the entire catalyst bed any tendency toward channeling of the fluid stream or streams or the by-passing of large masses of the catalyst by the material being processed is eliminated. Also this even distribution of the hydrocarbon materials, which are to undergo processing, throughout the reaction zones causes these reactants to experience a uniform conversion which in turn means that there is a substantially uniformly distributed deposit of deleterious materials throughout the catalyst bed during the processing period.

This deleterious material must be periodically removed to restore the activity of the catalyst and render it suitable for continuing the hydrocarbon conversion reaction. The most generally used method of removing this material, which consists principally of heavy hydrocarbonaceous matter, is to burn it from the catalyst by passing a stream of hot air or other oxygen-containing gas therethrough. During this generating period (i. e., that part of the operation cycle during which the carbonaceous material is removed), the uniform distribution of incoming reactivating gases together with the substantially uniform deposit of undesired matter upon the catalyst causes the temperature of the catalyst bed to remain substantially uniform throughout.

Another important feature of the invention, as applied to a catalytic reactor employed in a process utilizing low operating pressures, such as in the catalytic dehydrogenation of butane, for example, is the low pressure drop obtained through the catalyst bed.

The present invention provides a reactor in which substantially uniform distribution throughout the entire catalyst bed is achieved with a low pressure drop through the reactor by the novel arrangement of concentric proportioning inlet conduits and a catalyst bed confined between two concentric wire mesh screens or other suitable pervious members. The concentric inlet conduits are so chosen as to size that the incoming streams of reactants or reactivating gases, as the case may be, are divided into a plurality of separate streams, each of which is directed through a substantially proportionate cross-section of the catalyst bed.

In addition to the above mentioned features, the reactor herein provided is much easier and cheaper to build than the tray type reactors such as have previously been proposed for accomplishing even distribution and low pressure drop through the catalyst mass and, in addition, is better adapted to ready removal and replacement of the catalyst, when necessary, thereby reducing both the installation and operating costs as well as more efficiently utilizing the catalyst.

The features and advantages of the invention will be made more apparent with reference to the accompanying diagrammatic drawings wherein.

Figure 1:
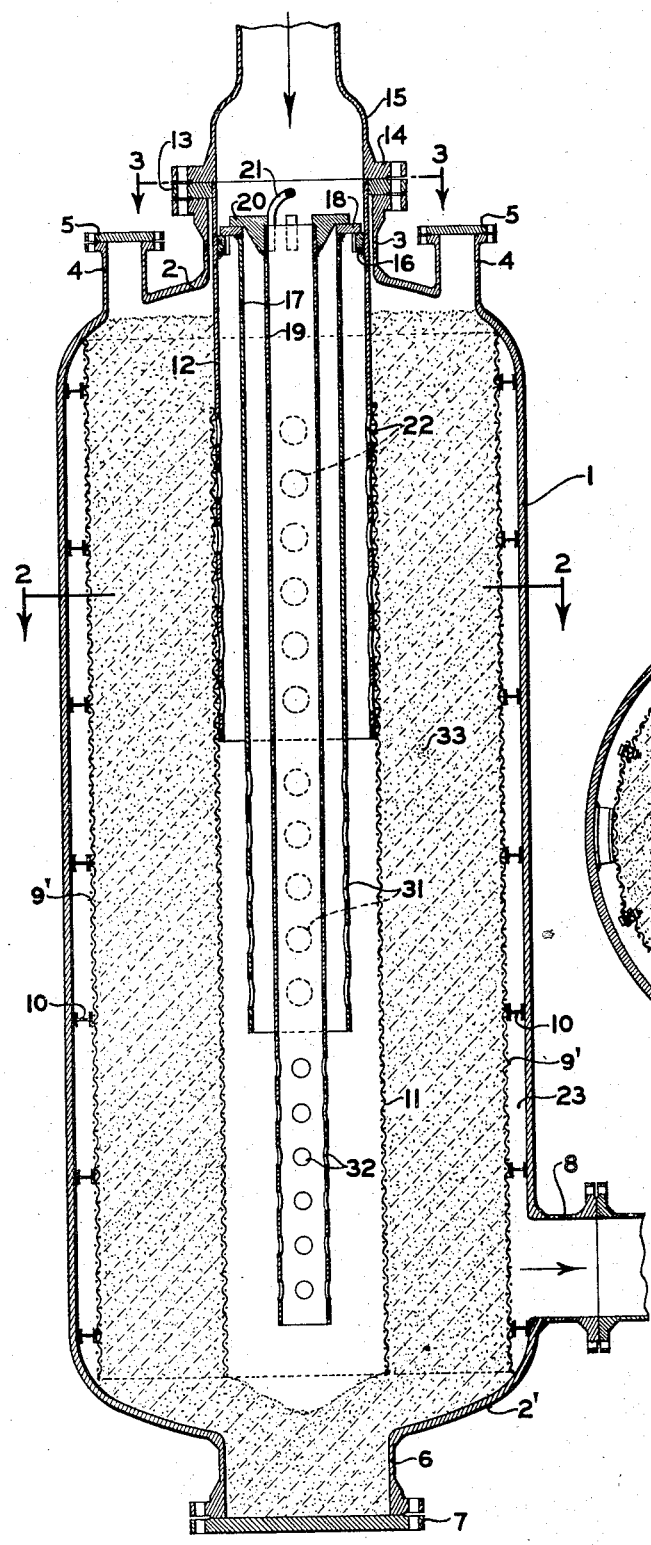
Fig. 1 shows a sectional elevation of one specific form of the reactor provided by the invention.
Figure 3:
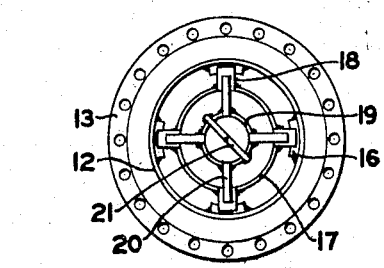
Fig. 3 shows a plan view of the reactor illustrated in Fig. 1 taken along the plane indicated by the line 3—3 in Fig. 1.
Figure 2:
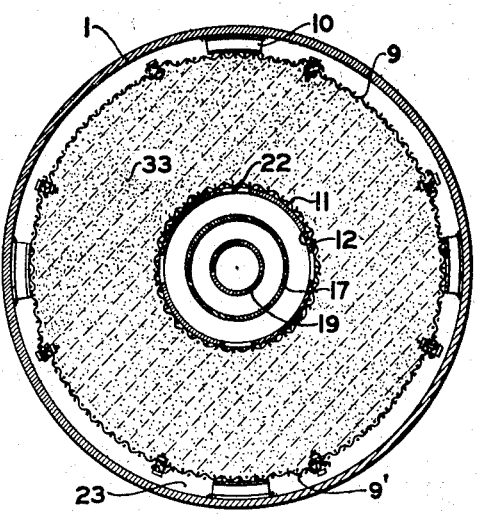
Fig. 2 illustrates a sectional plan view of the same reactor taken along the plane indicated by the line 2—2 in Fig. 1.

Referring to Figs. 1, 2, and 3, the body of the reactor is made up of an elongated cylindrical shell denoted by the reference numeral 1 and provided with elliptical heads 2 and 2' at its top and bottom ends. The upper head 2 is provided with an inlet nozzle 3 for the processing stream and access openings 4, through which latter fresh catalyst may be introduced into the reactor. The openings 4 are provided with cover flanges 5 for sealing the reactor during the operation thereof. These flanges may be secured to the reactor by suitable bolts, not shown. The bottom head 2' is equipped with an access nozzle 6 through which the spent catalyst may be removed from the reactor when desired. The nozzle 6 is provided with the cover flange 7 which is secured to the vessel by suitable bolts, not shown. Near the bottom of the shell the reactor is provided with an outlet nozzle 8 through which the reaction products and spent or partly spent reactivating gases are discharged from the reaction zone.

Within the reactor and spaced from the outer shell 1 by short lengths of structural members 10 welded to said shell is disposed an elongated cylindrical screenlike catalyst retaining member comprising a plurality of curved sections of screen 9 and 9' or other suitable pervious material, the alternate sections 9' being bolted to the H shaped members 10 by bolts, not shown. The adjoining sections are bolted together along their adjacent edges. Within the first mentioned catalyst retaining means and spaced therefrom is another elongated cylindrical catalyst retaining screenlike member 11. These two concentrically spaced screens, made up of any suitable material in which the openings are sufficiently small to prevent passage of the individual catalyst particles therethrough, provide an annular space into which a suitable catalyst may be charged and in which the catalyst will be retained during the operating period. The catalyst bed is indicated in the drawings by reference number 33.

The inner screen 11 is supported above the bottom of the reactor by the outer member 12 of a series of concentric inlet conduits to which it is attached by welding or any other suitable means. To the tube 12 is attached the filler flange 13 which is interposed between the inlet nozzle 3 and the companion flange 14. The companion flange 14 is attached in any desired manner to a suitable conduit 15 by means of which the incoming reactants or reactivating gases may be conveyed to the reactor through switch valves or other suitable stream directing equipment, not shown.

Disposed within the tube 12 is a smaller intermediate concentric tube 17 which is supported by the lugs 16 and 18 welded to the tubes 12 and 17, respectively.

Placed within the tube 17 is another concentric inner tube 19 which is supported from the intermediate concentric tube by lugs 20. The lugs 20 may be welded or otherwise suitably attached to the tube 19. To facilitate removal of the tube 19 from the reactor a looplike member 21 is attached to its upper end.

This invention is not limited to a definite number of concentric inlet tubes, as any desired number may be employed depending upon the size of reactor to be used, better distribution being obtainable by increasing the number of tubes as the reactor size is increased.

The outer concentric distribution tube 12 extends downward from the upper end of the reactor into the catalyst bed for a distance, equal to about one-third the depth of the latter and is provided with a plurality of perforations 22 in its portion disposed within the catalyst bed, these perforations starting at a point sufficiently below the top of the catalyst bed to provide a catalyst seal, thereby preventing any tendency of the processing stream to by-pass across the top of the catalyst bed from the inlet to the outlet zones of the reactor.

The intermediate tube 17 extends downward from the top of the reactor to beneath the lower end of the outer tube 12 for a distance about equal to one-third the total depth of the catalyst bed and is provided with perforations 31 in only that portion of the tube extending beneath tube 12.

The central tube 19 extends from the top of the reactor to within a short distance from the bottom of the catalyst bed and is provided with perforations 32 in only that portion which projects beyond the lower end of the intermediate tube 17.

The diameters of the conduits 17, 19, and 12 may be chosen so that substantially equal portions of the incoming stream may be diverted to substantially equal portions of the catalyst bed. For example, if the tubes 17, 19, and 12 are made up respectively from standard 4 inch, 6 inch and 8 inch pipe the stream of incoming materials will be divided into three substantially equal portions. It is well within the scope of this invention to use tubing of suitable size in place of the standard pipe. In many cases, for instance, where a large number of concentric tubes are desired, it will be advantageous to use seamless steel tubing because of the great variety of sizes available.

Between the outer catalyst retaining screen and the wall of the reactor an annular space 23 is provided for the purpose of collecting the reacted materials and spent reactivating gases, after they have passed through the catalyst bed, and conducting them to the outlet nozzle 8.

Figure 4:
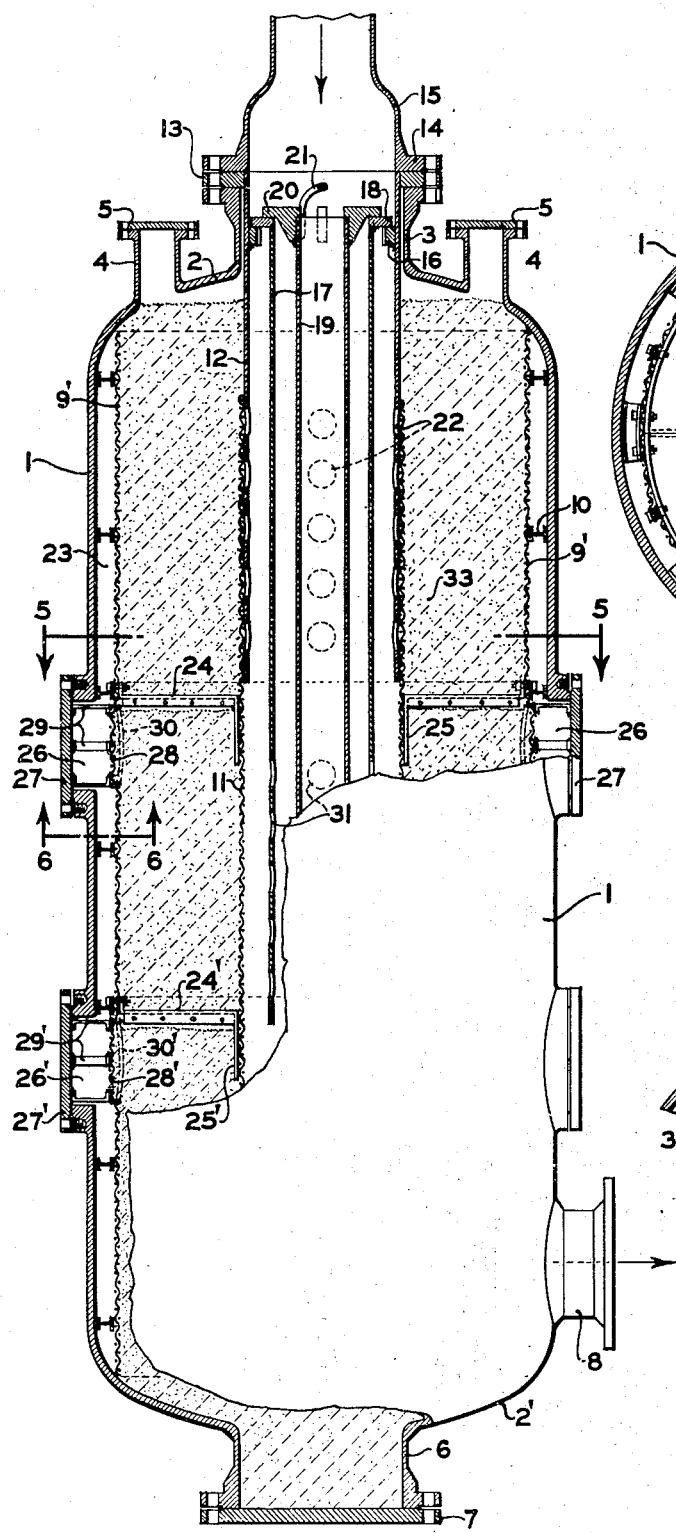
Fig. 4 illustrates an elevational view, shown principally in section, of a modified form of reactor provided by the invention.
Figure 5:
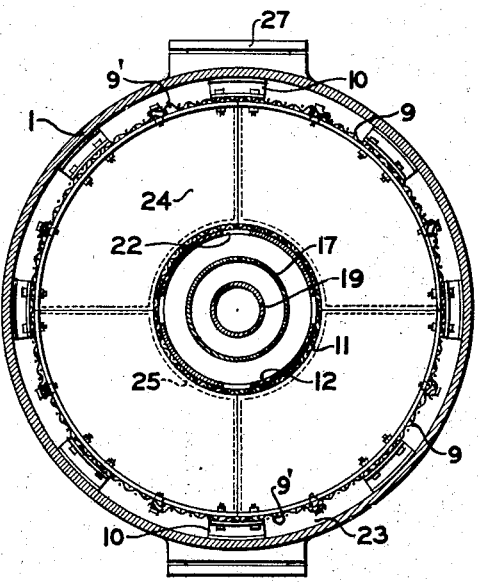
Fig. 5 is a plan view of the reactor shown in Fig. 4, this view being taken along the plane indicated by line 5—5 in Fig. 4.
Figure 6:
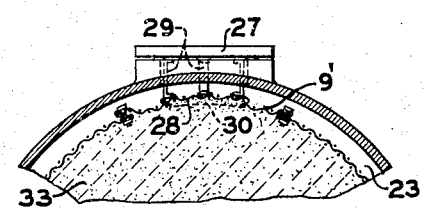
Fig. 6 is a sectional view of a fragmentary portion of the reactor of Fig. 4, showing an access opening in the shell and taken along the plane indicated by the line 6—6 in Fig. 4.

In Figs. 4, 5, and 6 a modified form of reactor is shown for use when it is desired to employ a relatively long reactor and the catalyst located in the lower portion of the bed would normally have a tendency to pack excessively. Portions of the reactor shown in Figs. 4, 5 and 6 corresponding to portions of the reactor shown in Figs. 1, 2 and 3 are designated by the same reference numerals.

In this reactor transverse partitions 24 and 24' are located at spaced apart points in the catalyst bed to divide it into substantially equal longitudinal sections, each of which is sufficiently shallow so that there will be no excessive packing in any part thereof. The partitions 24 and 24' may be made up, as shown in Fig. 5, of a plurality of segments bolted together along their adjacent edges and provided with a turned down portion 25 and 25' adjacent the inner retaining screen. This turned down portion acts as a seal for preventing gases from by-passing the catalyst at the top of the intermediate and lower portions of the bed. The partitions may be supported in the reactor by bolting or otherwise suitably securing them to the H shaped members 10.

Access openings 26 and 26' are provided in shell 1 for use in the removal of spent catalyst from the reactor and refilling of the reactor with fresh catalyst. To seal the openings 26 and 26' during operation of the reactor the cover flanges 27 and 27' are provided and secured to the vessel by suitable bolts, not shown. A curved section 28 and 28' of screen or other suitable pervious material is fastened to and spaced from the cover 27 and 27' by members 29 and 29' which may be welded to or otherwise suitably secured to the members 27 and 27' and 28 and 28'. The curved sections 28 and 28' are of such size and so spaced from the covers 27 and 27' that they overlap the edges of access openings 30 and 30' provided in the outer concentric retaining screen.

When the reactor is in operation the incoming materials supplied to the reactor through conduit 15 are divided into separate streams of substantially equal volume by the concentric tubes 12, 17 and 19. The separate streams will proceed downward within these tubes until they reach the various perforations 22, 31 and 32 through which the said streams will pass into the catalyst bed. After passing through the catalyst bed the various streams will be gathered in the annular space 23 and conducted to the outlet nozzle 8, proceeding from there to any further equipment desired.

When, after prolonged use and periodic regeneration, the catalyst becomes permanently spent and its removal from the reactor is desired all that is necessary, in the case of the vessel shown in Fig. 1, is to remove the cover flange 7 at the bottom and allow the catalyst to drop out into a waiting truck, car or any other available conveyance, not shown, by means of which it is transported away from the reactor. The cover flange 7 is then replaced and the flanges 5 are removed to allow the desired fresh catalyst to be introduced through the nozzles 4.

In the longer reactor illustrated in Fig. 4, when dumping the catalyst, it is necessary to remove the inner retaining screen with the nest of concentric distribution tubes. When the catalyst has been removed the inner screen and nest of tubes is replaced and the fresh catalyst introduced to the various portions of the reactor through their respective access openings 4, 26 and 26'.

I claim as my invention:

1. A reactor of the class described comprising, in combination, an elongated substantially cylindrical vessel having an outer shell closed at its opposite ends, inlet means for fluid reactants comprising a plurality of concentrically arranged conduits disposed lengthwise of and centrally within the vessel and each communicating at one end with a common inlet conduit, said conduits being progressively shorter from the inner to the outer conduit of the group and each being provided with openings through its walls in that portion thereof not surrounded by another conduit of the group, a pervious member disposed about the openings in the outermost conduit of the group and extending therefrom to adjacent the protruding end of the innermost conduit of the group, another pervious member disposed within said shell concentric with and spaced from the first named pervious member to provide an annular space therebetween for the reception of a mass of granular contact material and to provide another annular space between the last said pervious member and said shell, and outlet means on the shell communicating with the last named annular space.

2. A reactor of the class described comprising, in combination, an elongated substantially cylindrical vessel having an outer shell closed at its opposite ends, an inlet zone defined by an elongated substantially cylindrical pervious member extending lengthwise of the shell and substantially concentric therewith, an inlet connection on the shell communicating with said inlet zone, an outlet zone comprising an annular space provided between said shell and another pervious member spaced from and substantially concentric with the first named pervious member, the annular space between said pervious members comprising a zone for the reception of a mass of granular contact material, an outlet connection on the shell communicating with said outlet zone and a plurality of concentrically arranged distributing conduits disposed lengthwise of the shell within said inlet zone, said distributing conduits being progressively shorter from the innermost to the outermost conduit of the group and each being provided with openings through its walls in that portion thereof not surrounded by another conduit of the group.

3. The reactor defined in claim 2, wherein the said annular space between said pervious members is divided into a plurality of superimposed annular zones by spaced partitions extending across said annular space between the pervious members.

4. The apparatus defined in claim 2, having ports with removable closure means therefor provided at opposite ends of the vessel, one of said ports being in communication with said space provided for the reception of the mass of granular contact material and the other port being in communication with said distributing conduits at one end of the latter, the last named port and distributing conduits and the first named pervious member being constructed and arranged to permit removal of said pervious member and distributing conduits from the vessel through said port.

WILLIAM R. KINNAIRD.